United States Patent [19]

Saho et al.

[11] Patent Number: 5,443,548
[45] Date of Patent: Aug. 22, 1995

[54] CRYOGENIC REFRIGERATION SYSTEM AND REFRIGERATION METHOD THEREFOR

[75] Inventors: Norihide Saho, Tsuchiura; Hisashi Isogami, Ibaraki; Yasuo Yamashita, Hitachi; Hiroyuki Kawakami, Hitachi; Taisei Uede, Hitachi, all of Japan

[73] Assignee: Hitachi, Ltd., Tokyo, Japan

[21] Appl. No.: 86,893

[22] Filed: Jul. 7, 1993

[30] Foreign Application Priority Data

Jul. 9, 1992 [JP] Japan ................... 4-182110

[51] Int. Cl.$^6$ .................. F17C 13/00; B01D 8/00
[52] U.S. Cl. .................. 62/51.1; 62/51.2; 62/55.5; 62/332; 62/335
[58] Field of Search ............ 62/51.1, 51.2, 55.5, 62/332, 335

[56] References Cited

U.S. PATENT DOCUMENTS

| | | | |
|---|---|---|---|
| 3,310,955 | 3/1967 | Sneden, Jr. et al. | 62/55.5 |
| 4,277,949 | 7/1981 | Longsworth | 62/51.1 X |
| 4,796,433 | 1/1989 | Bartlett | 62/51.1 X |
| 4,831,845 | 5/1989 | Oda et al. | 62/51.1 |
| 5,187,938 | 2/1993 | Mraz et al. | 62/51.1 |
| 5,201,184 | 4/1993 | Roth | 62/47.1 |

FOREIGN PATENT DOCUMENTS

| | | | |
|---|---|---|---|
| 0523871A1 | 6/1992 | European Pat. Off. | |
| 10755 | 3/1971 | Japan | 62/51.1 |
| 2748 | 1/1978 | Japan | 62/51.1 |
| 24156 | 3/1978 | Japan | 62/51.1 |
| 146352 | 12/1978 | Japan | 62/51.1 |
| 603818 | 4/1978 | U.S.S.R. | 62/51.1 |
| 1333836 | 8/1987 | U.S.S.R. | |
| WO91/14141 | 9/1991 | WIPO | |

OTHER PUBLICATIONS

Patent Abstracts of Japan–vol. 17, No. 285 (C–1066)(5914) 2 Jun. 1993 and JP-A-05 015 764 (Hitachi) 26 Jan. 1993 *abstract*.
Patent Abstracts of Japan–vol. 16, No. 335 (M–1283)(5378) 21 Jul. 1992 and JP-A-04 098052 (Hitachi) 30 Mar. 1992 *abstract*.
Patent Abstracts of Japan–vol. 9, No. 95 (E–310)(1818) 24 Apr. 1985 and JP-A-59 222 976 (Hitachi) 14 Dec. 1984 *abstract*.
Cryogenics–vol. 32, 1992, Guildford GB–pp. 56–59, XP321163, Spath, et al. 'A 2 KW He Refrigerator for SC Magnet tests down to 3.3K' *p. 56, paragraph 1–paragraph 5*.
Cryogenics–Vo. 30, No. Sup., Sep. 1990, Guildford GB, pp. 514–522, XP168728 J. C. Boissin 'Cryopumps for Plasma Exhaust of Fusion Reactors'.
Hitachi Review–vol. 34, No. 3, Jun. 1985, Tokyo, JP–pp. 127–130 Doi et al. 'Helium Liquefier and Refrigerator for e+e–Colliding Beam Detector TOPAZ'.

*Primary Examiner*—Christopher Kilner
*Attorney, Agent, or Firm*—Antonelli, Terry, Stout & Kraus

[57] ABSTRACT

A plurality of cryopumps are installed in each of a plurality of neutral beam injection apparatuses disposed around a nuclear fusion apparatus.

The cryopanels of each of the cryopumps are refrigerated by a small helium refrigerating machine. Since the cryopanels are refrigerated from room temperature with cold liquid nitrogen used for refrigerating a heat shield plate, then a small helium refrigerating machine and finally cold liquid helium itself, various valves and a small helium refrigerating machine are disposed. This permits refrigeration of a plurality of cryopumps within a short time, thereby saving the power consumption and improving the operating reliability of a refrigeration system.

13 Claims, 3 Drawing Sheets

CRYOGENIC REFRIGERATION SYSTEM AND REFRIGERATION METHOD THEREFOR

BACKGROUND OF THE INVENTION

1. Field of the Invention

The present invention relates to a cryogenic refrigeration system, and more particularly to a cryogenic refrigeration system with refrigerating machines applicable to a nuclear fusion apparatus and corresponding apparatus.

2. Description of the Related Art

Conventional large cryopumps are used in each of a plurality of neutral beam injection apparatuses disposed around a nuclear fusion apparatus, as disclosed in, for example, Japanese Utility Model Unexamined Publication No. 62-167875. In this case, a plurality of cryopump units are combined, and each of the cryopump units is refrigerated with liquid helium and liquid nitrogen. The cryopanels of each of the cryopump units are refrigerated to about 3.7 K. with liquid helium, and the molecules of exhaust gas are condensed and adsorbed on the cryopanels to realize high-speed exhaust of gas. A heat shield plate, refrigerated to a low temperature of about 80 K. with liquid nitrogen, is disposed around the cryopanels of each of the cryopump units so that the cryopanels are not heated directly with the radiant heat emitted from a room temperature portion or a high temperature portion disposed outside the pumps.

Liquid helium used for refrigerating the cryopanels of each of the cryopump units is produced in a large helium liquefying refrigerating machine and transferred to each of the cryopump units through thermal insulating piping such as a transfer tube. The liquid helium is evaporated in the cryopanels to generate low-temperature helium gas which is recovered by the large helium liquefying refrigerating machine through another thermal insulating piping.

Liquid nitrogen is produced in a single large nitrogen liquefying machine, or it is transferred to each of the cryopump units from a single liquid nitrogen storage tank through thermal insulating piping such as a transfer tube or the like, and is evaporated in the heat shield plate of each cryopump unit to generate low-temperature nitrogen gas. The low-temperature nitrogen gas is discharged to the atmosphere.

In the above conventional large cryopump, since liquid helium, evaporated by a small amount of heat, is transferred to each cryopump unit from the large helium liquefying refrigerating machine through the long thermal insulating piping, a large amount of liquid helium is evaporated in the thermal insulating piping. The low-temperature helium gas generated by evaporation exhibits a lower heat transfer rate than that of liquid helium, and, thus, cannot be efficiently utilized for refrigerating the cryopanels. In addition, the helium gas increases the flow pressure loss in the thermal insulating piping, thereby necessitating an increase in the diameter of the thermal insulating piping. Since the amount of the heat which enters the thermal insulating piping is generally about 1 W/m, when the length of the thermal insulating piping reaches 200 m, an amount of liquid helium corresponding to about 200 W is evaporated.

In contrast, the amount of the heat which enters a cryopump is generally several watts to several tens of watts, and most of liquid helium is consumed only for simply refrigerating the thermal insulating piping. The conventional large cryopump thus requires a great amount of liquid helium for refrigerating the thermal insulating piping, and a large helium liquefying apparatus which consumes a large amount of power is thus indispensable.

Further, if gas leaks from a portion of the thermal insulating piping in which a vacuum atmosphere is present, the thermal insulating effect is significantly decreased, and a large amount of liquid helium in the thermal insulating piping is thus evaporated, thereby causing the danger of stopping the transfer function. In addition, the thermal insulating piping cannot be refrigerated from room temperature, thereby causing trouble in that the function of the cryopump is stopped.

Further, since liquid nitrogen is transferred from the large nitrogen liquefying machine to each of the cryopump units through the long thermal insulating piping, a large amount of liquid nitrogen is evaporated in the thermal insulating piping. The low-temperature nitrogen gas generated by evaporation of liquid nitrogen in the heat shield plate is discharged to the atmosphere, and cannot be utilized for refrigerating another component. This necessitates the constant supply of a large amount of liquid nitrogen.

Namely, in the above prior art, since the liquid helium and liquid nitrogen are produced by a concentration-type large helium liquefying machine and large nitrogen liquefying machine, respectively, are transferred through the thermal insulating piping disposed in atmosphere, and are used for refrigerating the cryopump group, the prior art has the following problems:

(1) a large amount of electric power is required for refrigerating the cryopanels;

(2) an expensive large helium liquefying machine and large nitrogen liquefying machine are required;

(3) long and large-aperture thermal insulating piping is required;

(4) a long time (several days) is required for refrigerating cryopanels because long thermal insulating piping must be previously refrigerated;

(5) a long time (several days) is also required for heating cryopumps; and (6) the refrigerating system has a low reliability.

However, in a neutral beam injection apparatus used in a recent large nuclear fusion apparatus, it is necessary to decrease the power required for refrigerating the cryopumps, decrease the time required for refrigerating, and improve the reliability.

SUMMARY OF THE INVENTION

An object of the present invention is to refrigerate a plurality of cryopumps provided in each neutral beam injection apparatus within a short time so as to decrease the power required for refrigerating and improve the operating efficiency of a refrigeration system.

Another object of the present invention is to omit or reduce as much as possible the supply of liquid nitrogen.

In accordance with one aspect of the present invention, each of a plurality of cryopumps disposed in a neutral beam injection apparatus is refrigerated by a small helium liquefying refrigerating machine and a small refrigerating machine for refrigerating a heat shield plate so that a liquid helium loss in thermal insulating piping can be decreased as much as possible. A liquid nitrogen container used for refrigerating the heat shield plate and a small helium refrigerating machine are disposed in the small helium liquefying refrigerating machine so as to refrigerate cryopanels from room temperature.

In another aspect of the present invention, there is provided a refrigeration system comprising a refrigerated body to be refrigerated to a cryogenic temperature by a refrigerating machine, a radiant heat shield body refrigerated to a low temperature for preventing the entrance of radiant heat into the refrigerated body from a high temperature portion, and a thermal insulating container for containing these bodies. In the system, the refrigerating machine comprises a cold generating circuit having first cold generating means and first compression means for supplying a working fluid to the first cold generating means, a cryogenic refrigerating circuit having second cold generating means and second compression means for supplying a working fluid to the second cold generating means, and a pre-refrigeration generating circuit having third cold generating means for supplying cold at a medium temperature between room temperature and a cryogenic temperature. The cold generating circuit and the cryogenic refrigeration circuit are thermally combined, and the pre-refrigeration generating circuit and the cryogenic refrigeration circuit are thermally connected to the refrigerated body so that the radiant heat shield body is refrigerated by the pre-refrigeration generating circuit.

In accordance with still another aspect of the present invention, there is provided a cryogenic refrigeration system comprising a refrigerated body to be refrigerated to a cryogenic temperature by a refrigerating machine, a radiant heat shield body refrigerated to a low temperature for preventing the entrance of the radiant heat into the refrigerated body from a high temperature portion, and a thermal insulating container for containing these bodies. In the apparatus, the refrigerating machine comprises a cold generating circuit having first cold generating means and first compression means for supplying a working fluid to the first cold generating means, a cryogenic refrigeration circuit having second cold generating means and second compression means for supplying a working fluid to the second cold generating means, and a pre-refrigeration generating circuit having third cold generating means for supplying cold at a medium temperature between room temperature and a cryogenic temperature. The cold generating circuit and the cryogenic refrigeration circuit are thermally combined so that the refrigerated body is refrigerated by the cryogenic refrigeration circuit, and the radiant heat shield body is refrigerated by the pre-refrigeration generating circuit.

In accordance with a further aspect of the present invention, there is provided a cryogenic refrigeration system comprising a plurality of refrigerated bodies to be respectively refrigerated to a cryogenic temperature by a plurality of refrigerating machines, a plurality of radiant heat shield bodies refrigerated to a low temperature for preventing the entrance of radiant heat into the refrigerated bodies from a high temperature portion, and a thermal insulating container for containing these bodies. In the apparatus, each of the plurality of refrigerating machines comprises a plurality of cold generating circuits each having first cold generating means and single first compression means for supplying a working fluid to the first cold generating means, a cryogenic refrigeration circuit having second cold generating means and single second compression means for supplying a working fluid to the second cold generating means, and a pre-refrigeration generating circuit having a plurality of third cold generating means for supplying cold at a medium refrigeration temperature between room temperature and a cryogenic temperature. The cold generating circuits and the cryogenic refrigeration circuit are thermally combined, and the refrigerated bodies are thermally connected to the cryogenic refrigeration circuit and the pre-refrigeration generating circuit so that the radiant shield bodies are refrigerated by the pre-refrigeration generating circuit.

In accordance with a still further aspect of the present invention, there is provided a cryogenic refrigeration system comprising a plurality of refrigerated bodies to be respectively refrigerated to a cryogenic temperature by a plurality of refrigerating machines, a plurality of radiant heat shield bodies refrigerated to a low temperature for preventing the entrance of radiant heat into the refrigerated bodies from a high temperature portion, and a thermal insulating container for containing these bodies. In the apparatus, each of the plurality of refrigerating machines comprises a plurality of cold generating circuits each having first cold generating means land single compression means for supplying a working fluid to the first cold generating means and to a plurality of third cold generating means for supplying a medium refrigeration temperature between room temperature and a cryogenic temperature, a pre-refrigeration generating circuit, and a cryogenic refrigeration circuit having second cold generating means and single second compression means for supplying a working fluid to the second cold generating means. The cold generating circuits and the cryogenic refrigeration circuit are thermally combined so that the refrigerated bodies are refrigerated by the cryogenic refrigeration circuit, and the radiant heat shield bodies are refrigerated by the pre-refrigeration generating circuit.

In accordance with a further aspect of the present invention, there is provided a cryogenic refrigeration system comprising a plurality of refrigerated bodies to be respectively refrigerated to a cryogenic temperature by a plurality of refrigerating machines, a plurality of radiant heat shield bodies refrigerated to a low temperature for preventing the entrance of radiant heat into the plurality of refrigerated bodies from a high temperature portion, and a thermal insulating container for containing these bodies. In the apparatus, each of the plurality of refrigerating machines comprises a plurality of cold generating circuits each having first cold generating means and single first compression means for supplying a working fluid to the first cold generating means, a cryogenic refrigeration circuit having second cold generating means and single second compression means for supplying a working fluid to the cold generating means, and a plurality of pre-refrigeration generating circuits having single third compression means for supplying a working fluid to a plurality of third cold generating means for supplying cold at a medium refrigeration temperature between room temperature and a cryogenic temperature. The plurality of cold generating circuits and the cryogenic generating circuit are thermally combined, and the refrigerated bodies are thermally connected to the cryogenic refrigeration circuit and the plurality of pre-refrigeration circuits so that the plurality of radiant heat shield bodies are refrigerated by the plurality of pre-refrigeration generating circuits.

In accordance with a further aspect of the present invention, there is provided a cryogenic refrigeration system comprising a plurality of refrigerated bodies to be respectively refrigerated to a cryogenic temperature by a plurality of refrigerating machines, a plurality of radiant heat shield bodies refrigerated to a low temperature for preventing radiant heat into the plurality of refrigerated bodies from a high temperature portion, and a thermal insulating container for containing these bodies. In the refrigeration apparatus, each of the plurality of refrigerating machines comprises a plurality of cold generating circuits each having first cold generating means and single first compression means for supplying a working fluid to the first cold generating means, a cryogenic refrigeration circuit having second cold generating means and single second compression means for supplying a working fluid to the second cold generating means, and a plurality of pre-refrigeration generating circuits having single third compression means for supplying a working fluid to a plurality of third cold generating means for supplying cold at a medium refrigeration temperature between room temperature and a cryogenic temperature. The plurality of cold generating circuits and a portion of the cryogenic refrigeration circuit are thermally combined so that the refrigerated bodies are mainly refrigerated by the cryogenic refrigeration circuit, and the radiant head shield bodies are refrigerated by the plurality of pre-refrigeration generating circuits.

In the present invention, a neutral beam injection apparatus is provided with a plurality of cryopumps each of which is connected to a small helium liquefying refrigerating machine so that cryopanels can be independently refrigerated by the helium liquefying refrigerating machine.

Since helium gas serving as a working medium which generates a low temperature in the small helium liquefying refrigerating machine can be supplied and collected through room-temperature piping, vacuum thermal insulating piping need not be disposed, thereby preventing heat loss. In addition, since the room-temperature piping exhibits higher operating reliability than that of the vacuum thermal insulating piping, the reliability of the refrigeration system can be improved.

Further, when a small refrigerating machine for refrigerating a 80-K heat shield plate only to a medium temperature, or a small refrigerating machine for refrigerating a liquid nitrogen tank and a 80-K heat shield plate only to a medium temperature is also provided, the supply of liquid nitrogen can be decreased as much as possible.

DESCRIPTION OF THE PREFERRED EMBODIMENTS

Figure 1:
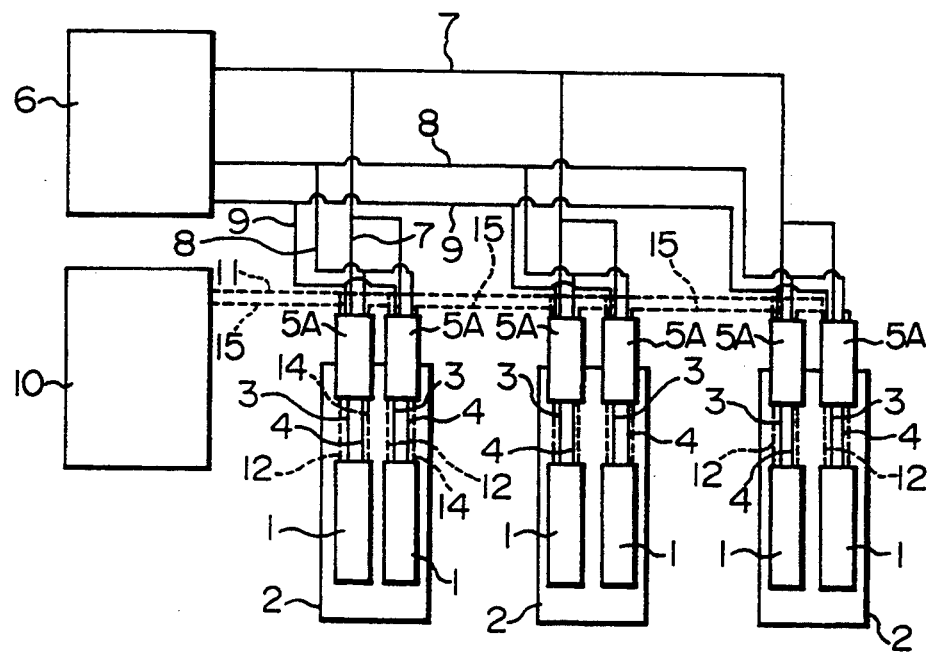
FIG. 1 is a view illustrating the construction of a cryopump refrigeration system in accordance with an embodiment of the present invention.

FIG. 1 shows an example of the construction of a cryopump refrigeration system, wherein a plurality of cryopumps 1 are disposed in a vacuum container 2 of a neutral beam injection apparatus of a nuclear fusion apparatus. Each of the cryopumps 1 is connected to a small helium liquefying refrigerating system 5A through cryogenic helium supply piping 3 and cryogenic helium collection piping 4. Room-temperature high-pressure helium gas is supplied to each of the small helium liquefying refrigerating system 5A from a helium compressor 6 through high-pressure piping 7. The high-pressure helium gas adiabatically expands in each of the small helium liquefying refrigerating system 5A to generate room-temperature medium-pressure helium gas and room-temperature low-pressure helium gas, both of which are collected by the helium compressor 6 through medium-pressure piping 8 and low-pressure piping 9, respectively.

A heat shield plate 32 is refrigerated with the cold generated by a small helium refrigerating machine 23 contained in each of the small helium liquefying refrigerating system 5A. The heat shield plate 32 is connected to the small helium refrigerating machine 23 through low-temperature helium supply piping 12 and low-temperature helium collection piping 14.

Room-temperature high-pressure helium gas is supplied to the small helium refrigerating machine 23 for refrigerating the heat shield plate 32 from a helium compressor 10 through high-pressure piping 11. The high-pressure helium gas adiabatically expands in the small helium refrigerating machine 23 to generate room-temperature medium-pressure helium gas and room-temperature low-pressure helium gas, both of which are collected by the helium compressor 10 through medium-pressure piping 15.

Figure 2:
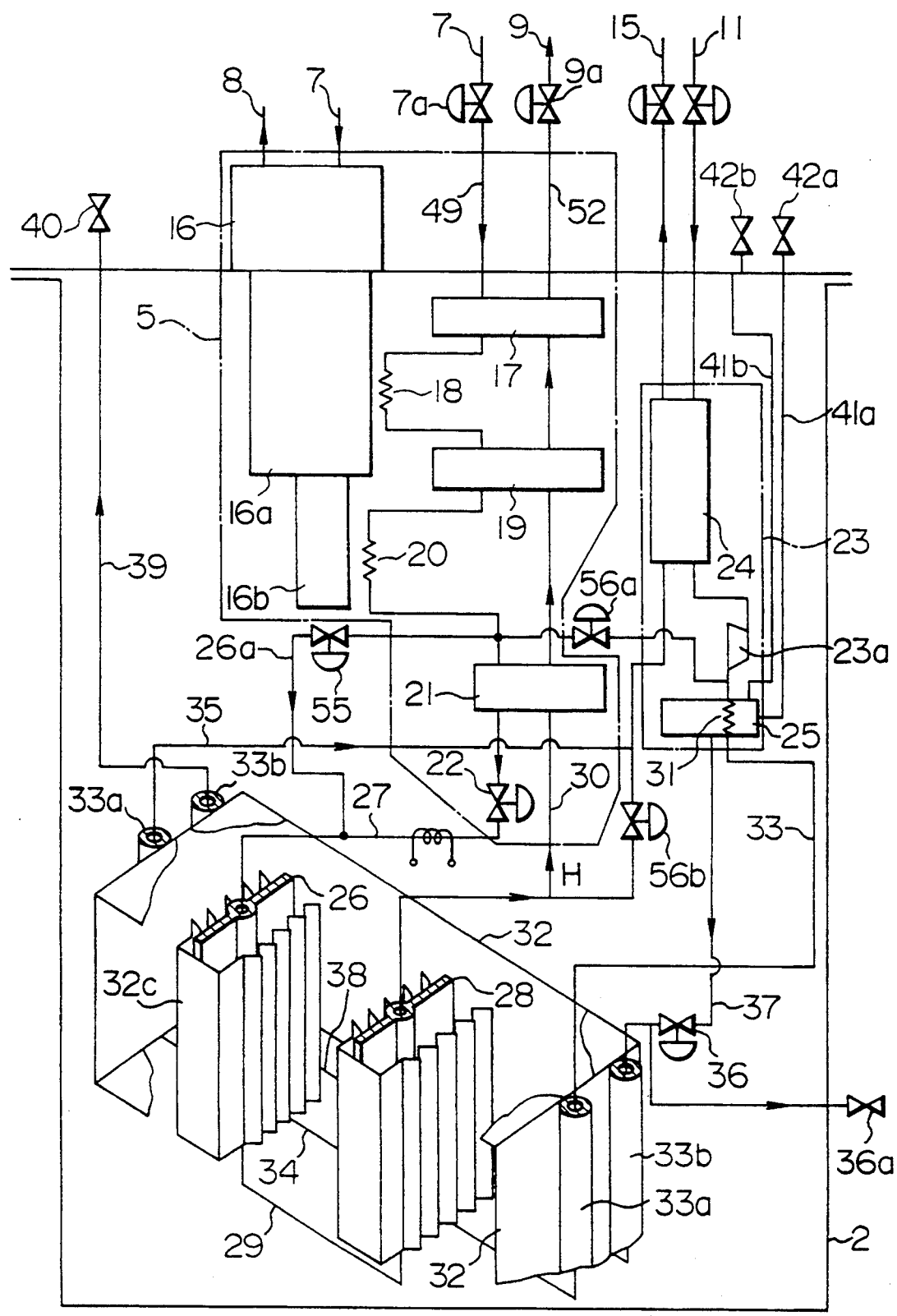
FIG. 2 is a view illustrating the construction of a refrigeration system for a single cryopanel in a vacuum container in the embodiment of the present invention.

FIG. 2 shows an example of the construction of a refrigeration system for a cryopanel provided in each of the vacuum containers 2. Each of the small helium liquefying refrigerating machines 5 is provided with a helium expander 16 serving as first cold generating means represented by a Gifford-MacMahon expander, heat exchangers 17, 18, 19, 20 and 21, and a Joule-Thomson valve 22 (referred to as "J.T valve" hereinafter) serving as second cold generating means. The heat exchangers 17, 18, 19, 20 and 21 and the J.T valve 22 form a Joule-Thomson circuit (referred to as "J.T circuit" hereinafter).

The small helium refrigerating machine 23 for refrigerating the heat shield plate 32 contained in the apparatus has an expander 23a such as a small turbine or the like, a heat exchanger 24 and a liquid nitrogen container 25, and is used as third cold generating means.

A cryopanel 26, functioning as a refrigerated body for condensing and solidifying exhaust gas on the cryogenic surface thereof and exhausting the gas is connected to the outlet of the J.T valve 22 through piping 27, and is connected to the adjacent cryopanel 28 by piping 29. The cryopanel 28 is connected to the heat exchanger 21 through piping 30.

As a further arrangement, the outlet of the high-pressure piping of the heat exchanger 24 is connected to the inlet of the expander 23a, and the outlet of the expander 23a is connected to a heat exchanger 31 provided in the liquid nitrogen container 25. The outlet side of the heat exchanger 31 is connected to a refrigerating pipe 33a of the heat shield plate 32 through piping 33, and connected to piping 34 and then to the heat exchanger 24 through piping 35.

The lower portion of the liquid nitrogen container 25 is connected to the refrigerating pipe 33b of the heat shield plate 32 and a valve 36 through piping 37 and piping 38. The other end of the refrigerating pipe 33b is open to atmosphere through piping 39 and a valve 40. The upper portion of the liquid nitrogen container 25 is open to atmosphere through piping 41a and a valve 42b. Liquid nitrogen is supplied to the liquid nitrogen container 25 through the piping 41a and the valve 42a, and nitrogen gas is discharged through piping 41b and valve 42b.

A method of refrigerating the cryopumps described below.

The temperature of the high-pressure gas introduced into the heat exchanger 24 from the helium compressor 10 through the high-pressure piping 11 is decreased by heat exchange in the heat exchanger 24, and the gas then flows into the expander 23a. The pressure of the high-pressure gas is decreased by adiabatic expansion in the expander 23a, and the temperature of the gas is further decreased. The expanded low-temperature gas flows into the heat exchanger 31 provided in the liquid nitrogen container 25, and then flows into the refrigerating pipe 33a of the heat shield plate 32 through the piping 33 so as to refrigerate the heat shield plate 32. At the same time, liquid nitrogen is supplied to the liquid nitrogen container 25 through the valve 42a and the piping 41a. The liquid nitrogen flows into the refrigerating pipe 33b of the heat shield plate 32 from the container 25 through the piping 37 and the valve 36 so as to pre-refrigerate the heat shield plate 32 and louvers 32c supported by the heat shield plate 32.

After the heat shield plate 32 is refrigerated to the liquid nitrogen temperature of about 80 K., the valves 36, 42a and 42b are closed for stopping the supply of liquid nitrogen. The heat shield plate 32 refrigerated to about 80 K. with liquid nitrogen and the liquid nitrogen container 25 are then refrigerated only by the cold expanded gas generated in the small helium refrigerating machine 23. Before refrigeration using the cold gas generated by the small helium refrigerating machine 23, the valves 42a and 36 are opened for introducing helium gas, and the valve 36a is opened to atmosphere for blowing liquid nitrogen so as to prevent the occurrence of solid nitrogen. After liquid nitrogen is completely blown, the valve 36a is closed for refrigerating the heat shield plate 32. This permits refrigeration of the heat shield 32 to about 10 K.

The cryopanels 26 and 28 are pre-refrigerated by the method below.

The low-temperature expanded gas generated in the expander 23a is caused to flow into the cryopanels 26 and 28 through the valves 56a and 55 and the piping 26a to refrigerate the cryopanels 26 and 28. After refrigeration, the expanded gas is caused to flow into the low-pressure gas passage of the heat exchanger 24 through the valve 56b, and is recovered. At this time, flow regulating valves 7a and 9a are closed. After the cryopanel 26 is refrigerated to the liquid nitrogen temperature, the valves 56a and 56b are closed, and the flow regulating valves 7a and 9a are opened. Refrigeration is then finished.

The cryopanel 26 is then refrigerated to the liquid helium temperature, i.e., about 3.7 K., by the method below.

Room-temperature high-pressure helium gas is supplied to the helium expander 16 from the helium compressor 6 through the high-pressure piping 7. Adiabatic expansion takes place in the helium expander 16, and cold at a temperature of about 50 K. and cold at a temperature of about 10 K. are generated in first and second stages 16a and 16b, respectively. The flow rate of the high-pressure helium gas which flows into the heat exchangers 18 and 20 is regulated by the flow regulating valve 55 in the state where the J.T valve 22 disposed in the cryogenic portion is closed.

When the cryopanels are refrigerated to about 80 K., the flow regulating valve 7a disposed on the high-pressure piping 7 and the valve 55 are opened, and the flow regulating valve 9a is slightly opened. The room-temperature high-pressure helium gas, flowing into the J.T circuit through the flow regulating valve 7a and the piping 49, is passed through the heat exchangers 17, 18, 19 and 20 and is then supplied to the cryopanels 26 and 28 through the valve 55 and the piping 26a so as to refrigerate the cryopanels 26 and 28 to about 10 K. without passing through the heat exchanger 21. The low-temperature low-pressure helium gas is then passed through the piping 30 and is subjected to heat exchange with high-pressure helium gas on the supply side in the heat exchangers 21, 19 and 17. The helium gas is then exhausted to the low-pressure piping 9 through the piping 52 and the flow regulating valve 9a.

After the cryopanels 26 and 28 are refrigerated to 10 K., the valve 55 is closed, and the flow regulating valve 9a is fully opened. The high-pressure helium gas flows into the slightly open J.T valve 22 through the heat exchanger 21, and is partially liquefied by adiabatic expansion therein to produce liquid helium at a temperature of 3.7 K. The low-pressure gas and liquid helium at a temperature of 3.7 K. flow into the cryopanel 26 through the piping 27 to refrigerate the cryopanels 26 and 28. The liquid helium is evaporated by the cryopanels 26 and 28 to produce helium gas. The cryogenic helium gas is passed through the piping 30 and flows into the heat exchangers 21, 19 and 17 in which high-pressure helium gas is refrigerated by the cryogenic helium gas to produce room-temperature low-pressure helium gas. The thus-produced helium gas flows into the low-pressure piping 9 through the flow regulating valve 9a.

In order to reproduce the cryopumps, the cryopanels are heated for separating the exhaust gas which is solidified on the surfaces of the cryopanels. In this case, the low-pressure helium gas downstream of the J.T valve is heated to a predetermined temperature by a heater H disposed on the piping 27 so as to heat the cryopanels at about 10 K. After the exhaust gas is separated from the cryopanels, heating by the heater H is stopped, and the cryopanels are refrigerated to 3.7 K. by the same method as in the refrigeration operation. Since the cryopanels are made of a material such as aluminum, stainless steel, copper or the like, and exhibit very low specific heat (W/kg·k) at a temperature of 10 K. or less, refrigeration from 10 K. to 3.7 K. is completed within a short time.

As described above, this embodiment permits the heat shield plate 32 of the cryopump 1 to be rapidly refrigerated in the pre-refrigeration stage within a short time using liquid nitrogen which exhibits large latent heat of evaporation, and the cryopanels to be refrigerated directly by the expansion turbine with a large refrigerating amount which can generate a large amount of cold, thereby rapidly refrigerating the cryopanels within a short time. In addition, since liquid nitrogen in the refrigerating pipe of the heat shield plate is removed after pre-refrigeration so that the heat shield plate can be refrigerated directly by the large refrigerating power of the expansion turbine which generates a large amount of cold, the heat shield plate can be refrigerated to a cryogenic temperature within a short time. The cryopanels are then refrigerated to about 80 K. by the small helium liquefying refrigerating machine. The embodiment thus has the effect of refrigerating and heating the cryopanels within a short time without the need for refrigerating the vacuum thermal insulating piping.

In addition, in this embodiment, since the vacuum heat insulating piping needs not be provided for transferring liquid helium, only the liquid helium is produced and supplied for refrigerating the cryopanels, thereby significantly decreasing the electric energy required for producing liquid helium, as compared with a conventional refrigeration system. Since the vacuum heat insulating piping need not be provided, a trouble such as a vacuum leak or the like which would be caused by the vacuum thermal insulating piping is not produced. Further, since only the J.T valve is operated at a low temperature, the reliability of the refrigeration system is improved. This embodiment also makes an expensive large liquid helium liquifying apparatus unnecessary, and thus has the effect of decreasing the cost of the refrigeration system.

Further, the flow rate in the turbine can be regulated in accordance with the heat load of the heat shield plate, and the flow rate in the helium compressor 10 can be regulated by the flow rate in the turbine, thereby preventing excessive refrigeration of the heat shield plate and saving the power consumption for operation.

Figure 3:
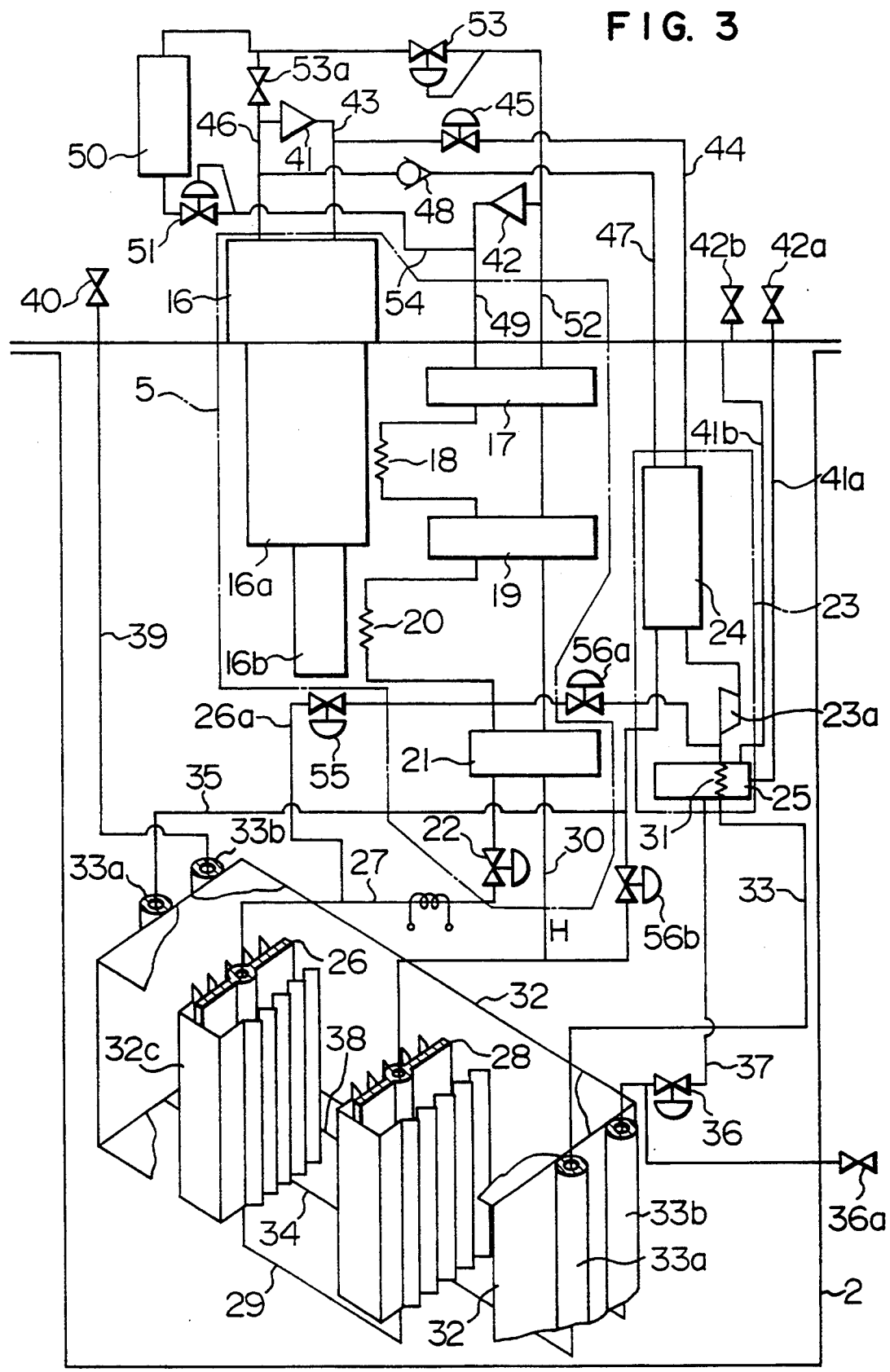
FIG. 3 is a view illustrating the construction of a refrigeration system for a single cryopanel in a vacuum container in accordance with another embodiment of the present invention.

In the embodiment of FIG. 3, high-pressure helium gas is supplied to a helium expander 16 from each of helium compressors 41 respectively disposed near cryopumps, and medium-pressure helium gas expanded is collected. High-pressure helium gas is also supplied to a heat exchanger 17 from a J.T circuit helium compressor 42 provided near a cryopump, and low-pressure helium gas expanded is collected.

As a further arrangement, high-pressure piping 43 for the helium compressor 41 is connected to high-pressure piping for a pre-refrigeration circuit through a flow regulating valve 45, and medium-pressure piping 46 of the helium compressor 41 is connected to medium-pressure piping 47 of the pre-refrigeration circuit through a check valve 48. High-pressure piping 49 of the helium compressor 42 is connected to an excessive gas storage tank 50 through a flow regulating valve 51, and low-pressure piping 52 of the helium compressor 42 is connected to the excessive gas storage tank 50 through a flow regulating valve 53. Medium-pressure piping of the helium compressor 41 is connected to the excessive gas storage tank 50 through a flow regulating valve 53a.

The high-pressure gas introduced into the heat exchanger 24 from the helium compressor 41 through the valve 45 and the high-pressure piping 44 is subjected to heat exchange in the heat exchanger 24 to be decreased in temperature, and then flows into a small helium refrigerating machine 23. In the small helium refrigerating machine 23, the pressure of the high-pressure gas is decreased by adiabatic expansion, and the temperature of the gas is further decreased. The low-temperature expanded gas flows into the heat exchanger 31 provided in a liquid nitrogen container 25, and then flows into the refrigerating pipe 33a of the heat shield place 32 through the piping 33 to refrigerate the heat shield plate 32. At the same time, liquid nitrogen is supplied to the liquid nitrogen container 25 through the valve 42a and the piping 41a, and is caused to flow into the refrigerating pipe 33b of the heat shield plate 32 through the piping 37 and the valve 36 to pre-refrigerate the heat shield plate 32 and the louvers 32c supported by the heat shield plate 32. After the heat shield plate 32 is refrigerated to the liquid nitrogen temperature, the valves 36, 42a and 42b are closed for stopping the supply of liquid nitrogen. The heat shield plate 32 and the liquid nitrogen container 25 are then refrigerated only by the cold expanded gas generated by the small helium refrigerating machine 23. At this time, helium gas is introduced from the valve 42a, and the valve 36a is opened to atmosphere in order to prevent the occurrence of solid nitrogen by blowing liquid nitrogen.

The cryopanels 26 and 28 are pre-refrigerated by the method below. The low-temperature expanded gas generated in the small helium refrigerating machine 23 is caused to flow into the cryopanels 26 and 28 through the valves 56a and 55. After the cryopanels 26 and 28 are refrigerated, the refrigerating gas is caused to flow into a low-pressure gas passage of the heat exchanger 24 through the valve 56b and is then recovered. At this time, the valves 7a and 9a are closed. When the cryopanels 26 and 28 are refrigerated to the liquid nitrogen temperature of about 80 K., the valves 56a and 56b are closed, and the valves 7a and 9a are opened. Refrigeration is then completed.

The cryopanels 26 and 28 are refrigerated to the liquid helium temperature by the method below. Room-temperature high-pressure helium gas is supplied to the helium compressor 16 from the helium compressor 41 through the high-pressure piping 43. The high-pressure helium gas is adiabatically expanded in the helium expander 16 to generate cold at a temperature of about 50 K. in a first stage 16a and cold at a temperature of about 10 K. in a second stage 16b. The flow rate of the high-pressure helium gas which is caused to flow into the heat exchangers 18 and 20 is regulated by using the flow regulating valve 55 in the state wherein the J.T valve 22 disposed in the cryogenic portion of the high-pressure piping 49 is closed. The high-pressure gas produced by expansion is returned to the helium compressor 41 through the piping 46.

After the cryopanels 26 and 28 are refrigerated to about 80 K. with liquid nitrogen, high-pressure helium gas is supplied to the high-pressure piping 49 from the helium compressor 42. The room-temperature high-pressure helium gas which flows into the J.T circuit comprising the heat exchangers 17, 18, 19, 20 and 21 and the J.T circuit 22 is passed through the heat exchangers 17, 18, 19 and 20, and then flows into the cryopanels 26 and 28 through the valve 55 and the piping 26a to refrigerate the cryopanels 26 and 28 to about 10 K. without passing through the heat exchanger 21. The low-temperature low-pressure helium gas then flows into the heat exchangers 21, 19 and 17 through the piping 30, is subjected to heat exchange with helium gas on the supply side in the heat exchangers 21, 19 and 17, and is discharged to the low-pressure piping 52.

After the cryopanels 26 and 28 are refrigerated to 10 K., the valve 55 is closed, and the flow regulating valve 9a is fully opened. The high-pressure helium gas is passed through the heat exchanger 21 and is then partially liquefied by adiabatic expansion in the J.T valve 22 which is slightly open to produce liquid helium at a temperature of 3.7 K. The low-pressure gas at a temperature of 3.7 K. and the liquid helium are supplied to the cryopanels 26 and 28 through the piping 27 to refrigerate the cryopanels 26 and 28, and are evaporated. The low-pressure cryogenic helium gas then flows into the heat exchangers 21, 19 and 17 through the piping 30. In the heat exchangers 21, 19 and 17, the temperature of the low-pressure helium gas is increased by refrigerating high-pressure helium gas to produce room-temperature low-pressure helium gas which then flows into the low-pressure piping 52.

In order to reproduce the cryopump, the exhaust gas solidified on the surfaces of the cryopanels is separated by heating the cryopanels. In this case, the cryopanels are heated to about 10 K. by heating the low-pressure helium gas downstream of the J.T valve using the heater H disposed on the piping 27 to a predetermined temperature. After the exhaust gas is separated from the cryopanels, heating by the heater H is stopped, and the cryopanels are refrigerated to 3.7 K. by the same method as that in the refrigerating operation. Since the cryopanels are made of a material such as aluminum, stainless steel, copper or the like, which exhibits very low specific heat at a temperature of 10 K. or less, refrigeration to 3.7 K. from 10 K. is completed within a short time.

The flow rate of helium supplied to the small helium refrigerating machine 23 from the helium compressor 41 is regulated to an appropriate value by the flow regulating valve 45. On the other hand, the flow rate of helium gas which flows into the excessive gas storage tank 50 is changed by regulating the flow regulating valves 51 and 53 and the valves 53a and 48 so that the flow rate of helium circulating in the helium compressors 42 and 41 is an appropriate value.

As described above, in the embodiment of FIG. 3, a large amount of room-temperature high-pressure helium gas is supplied, through the high-pressure piping 44, to the heat exchanger 24 and the small helium refrigerating machine 23 in the pre-refrigeration circuit from the helium compressor 41 which can process gas in an amount of about 10 times that of each of the helium compressors 42 respectively disposed near the cryopumps. In addition, pre-refrigeration is performed in parallel with refrigeration of the liquid nitrogen used for refrigerating the heat shield plate. The heat shield plate is then refrigerated to a predetermined cryogenic temperature by the small helium liquefying refrigerating machine 5 using the helium gas supplied from each of the helium compressors 41 and 42. Thus, vacuum heat insulating piping needs not be refrigerated and heated for refrigerating and heating the cryopanels, thereby decreasing the time required for refrigerating and heating the cryopanels.

In the embodiment of FIG. 3, since the helium compressor for the cryopump only is disposed near each of the cryopumps, the pressure loss of low-pressure helium gas can be decreased by decreasing the length of the low-pressure piping 52 in the J.T circuit. The power of the helium compressor required for obtaining low-pressure helium at a saturation pressure temperature of 3.7 K. at the outlet of the J.T valve can also be decreased, thereby decreasing the power consumption.

While, in this embodiment, high-pressure helium gas is supplied to the expander 16 and the small helium refrigerating machine 23 from the single compressor 41, compressors may also be respectively provided for the expander 16 and the helium refrigerating machine 23 so that the pressures of the expander 16 and the small helium refrigerating machine 23 can be set to the optimum value, thereby saving the operating power and providing a refrigeration system with excellent controllability.

Although, in this embodiment, the cryopanels are used in the refrigerated bodies, the use of a superconductive magnet or an electronic apparatus as a refrigerated body produces the same effects as those described above.

Although, in this embodiment, a Gifford-MacMahon refrigerating machine is used as the first cold generating means, the use, as the first cold generating means, of Solvay refrigerating machine, a Bill Mayer refrigerating machine, a pulse tube type refrigerating machine, a turbine type refrigerating machine, a Stirling refrigerating machine, a Claude refrigerating machine or a reciprocating refrigerating machine having a valve in a low-temperature portion thereof produces the same results.

Further, while in this embodiment, the J.T valve is used as the second cold generating means, the use, as the second cold generating means, of a turbine type expander, a Stirling expander or a reciprocating expander having a valve in a low-temperature portion thereof produces the same results.

Further, while in this embodiment, the turbine type expander using liquid nitrogen and helium is used as the third cold generating means, the use, as the third cold generating means, of a Stirling expander, a reciprocating expander having a valve in a low-temperature portion thereof or an expander which operates at 80 K. or more produces the same results.

In a differing arrangement when this invention is performed in a strong magnetic field space, if the moving components of the first, second and third cold generating means are made of a electrically good conductor, the movement of the moving components in a magnetic field produces an eddy current in the moving components to generate Joule heat corresponding to the resistivity value of the material of the moving components. The Joule heat flows into the cold generating portions of the moving components, and decreases the net amount of the cold generated, thereby decreasing the refrigerating efficiency.

Examples of such moving components include a piston, a piston driving device, a displacer, a cold accumulator, a turbine rotor and the like. If these moving components are made of an insulating material or non-conductive material such as a polymer material, ceramics or the like, it is possible to prevent the occurrence of an eddy current and a decrease in the refrigerating efficiency. Alternatively, when the moving components are surrounded by a magnetic absorber or magnetic shield which is made of a ferromagnetic material such as iron or the like or a diamagnetic material such as a high-temperature superconductor, the magnetic intensity in the frame of the magnetic absorber or magnetic shield can be decreased, and the occurrence of the eddy current can thus be decreased, thereby preventing a decrease in the refrigerating efficiency.

Figure 4:
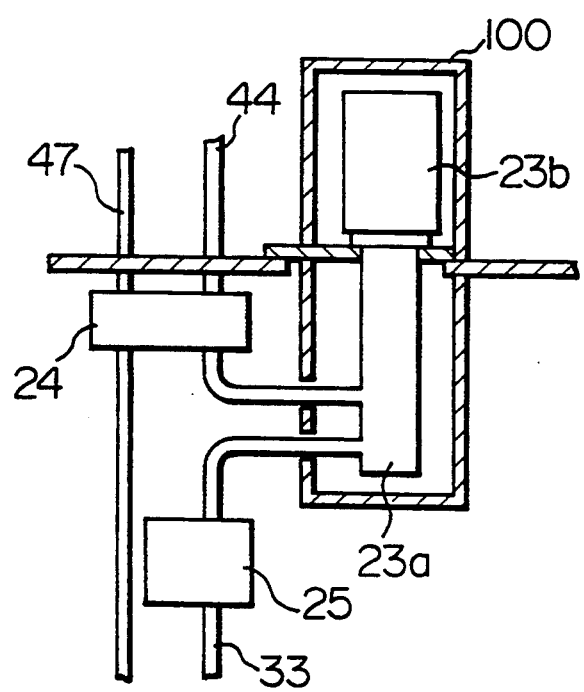
FIG. 4 is a sectional view illustrating a principal portion of a further embodiment of the present invention.

In a further embodiment of the present invention, a helium turbine type expander is used as the third cold generating means, and a magnetic absorber is disposed around the turbine type expander. A magnetic absorber 100 is disposed around a low-temperature cold generating portion 23a and a room-temperature turbine rotation controlling portion 23b of a turbine type expander so that the generation of Joule heat is decreased as much as possible, as shown in FIG. 4

In the present invention, since each of the plurality of cryopumps disposed in a neutral beam injection apparatus is refrigerated by a small helium liquefying refrigerating machine, the number of thermal insulating pipes for transporting liquid helium to the room-temperature portion is decreased, thereby decreasing the loss of liquid helium in the thermal insulating piping.

What is claimed is:

1. A cryogenic refrigeration system comprising:
   a refrigerated body refrigerated to a cryogenic temperature;
   a radiant heat shield body refrigerated to a low temperature for preventing the entrance of radiant heat into said refrigerated body from a high temperature portion;
   a thermal insulating container for containing said refrigerated body and said radiant heat shield body; and
   a refrigerating machine comprising a cold generating circuit having a first cold generating means and a first compression means for supplying a working fluid to said first cold generating means, a cryogenic refrigeration circuit having a second cold generating means and a second compression means for supplying a working fluid to said second cold generating means, and a pre-refrigeration generating circuit having a pre-refrigeration generating means for supplying a pre-refrigeration working fluid at a temperature between room temperature and a cryogenic temperature, wherein said cold generating circuit and said cryogenic refrigeration circuit share at least a portion of a circuit in common; and
   wherein said refrigerated body is thermally connected to said cold generating circuit and said cryogenic refrigeration circuit, and said radiant heat shield body is connected to and refrigerated by said pre-refrigeration generating circuit.

2. A cryogenic refrigeration system comprising:
   a refrigerated body refrigerated to a cryogenic temperature;
   a radiant heat shield body refrigerated to a low temperature for preventing the entrance of radiant heat into said refrigerated body from a high temperature portion;
   a thermal insulating container for containing said refrigerated body and said radiant heat shield body; and
   a refrigerating machine comprising a cold generating circuit having a first cold generating means and a first compression means for supplying a working fluid to said first cold generating means, a cryogenic refrigeration circuit having a second cold generating means and a second compression means for supplying a working fluid to said second cold generating means, and a pre-refrigeration generating circuit having a pre-refrigeration generating means for supplying a pre-refrigeration at a temperature between room temperature and a cryogenic temperature;
   wherein a circuit portion connected to said refrigerated body is shared in common by said cold generating circuit and said cryogenic refrigeration circuit, and said radiant heat shield body is refrigerated by said pre-refrigeration generating circuit.

3. A cryogenic refrigeration system comprising:
   a plurality of refrigerated bodies respectively refrigerated to a cryogenic temperature;
   a plurality of radiant heat shield bodies refrigerated to a low temperature for preventing entrance of radiant heat into said refrigerated bodies from a high temperature portion;
   a thermal insulating container for containing said plurality of refrigerated bodies and said plurality of radiant heat shield bodies; and
   a plurality of refrigerating machines, each of said plurality of refrigerating machines comprising a plurality of cold generating circuits each having a first cold generating means and a first compression means for supplying a working fluid to said first cold generating means, a cryogenic refrigeration circuit having a second cold generating means and a second compression means for supplying a working fluid to said second cold generating means, and a pre-refrigeration generating circuit having a plurality of pre-refrigeration generating means for supplying a pre-refrigeration working fluid at a temperature between room temperature and a cryogenic temperature, wherein said cold generating circuits and a portion of said cryogenic refrigeration circuit share at least a portion of a circuit in common; and
   wherein said refrigerated bodies are thermally connected to said cold generating circuits and said cryogenic refrigeration circuit and said radiant heat shield bodies are connected to and refrigerated by said pre-refrigeration generating circuit.

4. A cryogenic refrigeration system comprising:
   a plurality of refrigerated bodies respectively refrigerated to a cryogenic temperature;
   a plurality of radiant heat shield bodies refrigerated to a low temperature for preventing entrance of radiant heat into said refrigerated bodies from a high temperature portion;
   a thermal insulating container for containing said plurality of refrigerated bodies and said plurality of radiant heat shield bodies; and
   a plurality of refrigerating machines, each of said plurality of refrigerating machines comprising a plurality of cold generating circuits each having a first cold generating means and a single first compression means for supplying a working fluid to said first cold generating means, and a plurality of second cold generating means for supplying a refrigeration temperature between room temperature and a cryogenic temperature, a pre-refrigeration generating means for supplying a pre-refrigeration working fluid, and a cryogenic refrigeration circuit having a cryogenic cold generating means and a second compression means for supplying a cryogenic working fluid to said cryogenic cold generating means;
   wherein said cold generating circuits and a portion of said cryogenic refrigeration circuit share at least a refrigerated body circuit portion in common and said refrigerated bodies are refrigerated by said cryogenic refrigeration circuit, and said radiant heat shield bodies are refrigerated by said pre-refrigeration generating circuit.

5. A cryogenic refrigeration system comprising:
   a plurality of refrigerated bodies respectively refrigerated to a cryogenic temperature;
   a plurality of radiant heat shield bodies refrigerated to a low temperature for preventing entrance of radiant heat into said refrigerated bodies from a high temperature portion;
   a thermal insulating container for containing said plurality of refrigerated bodies and said plurality of radiant heat shield bodies; and a plurality of refrigerating machines, each of said plurality of refrigerating machines comprising a plurality of cold generating circuits each having a first cold generating means and a single first compression means for supplying a working fluid to said first cold generating means, a cryogenic refrigeration circuit having a second cold generating means and a second compression means for supplying a working fluid to said second cold generating means, and a plurality of pre-refrigeration generating circuits having a single pre-refrigeration compression means for supplying a pre-refrigeration working fluid to a plurality of pre-refrigeration generating means for supplying a cold at a temperature between room temperature and a cryogenic temperature, wherein said cold generating circuits and said cryogenic refrigeration circuit share at least a portion of a circuit in common; and wherein said refrigerated bodies are thermally connected to said cold generating circuits and said cryogenic refrigeration circuit, and said radiant heat shield bodies are connected to and refrigerated by said pre-refrigeration generating circuits.

6. A cryogenic refrigeration system comprising:

a plurality of refrigerated bodies respectively refrigerated to a cryogenic temperature;

a plurality of radiant heat shield bodies refrigerated to a low temperature for preventing entrance of radiant heat into said refrigerated bodies from a high temperature portion;

a thermal insulating container for containing said plurality of refrigerated bodies and said plurality of radiant heat shield bodies; and a plurality of refrigerating machines, each of said plurality of refrigerating machines comprising a plurality of cold generating circuits each having a first cold generating means and a single first compression means for supplying a working fluid to said first cold generating means, a cryogenic refrigeration circuit having a second cold generating means and a second compression means for supplying a working fluid to said second cold generating means, and a plurality of pre-refrigeration generating circuits having a single pre-refrigeration compression means for supplying a pre-refrigeration working fluid to a plurality of pre-refrigeration generating means for supplying a cold at a temperature between room temperature and a cryogenic temperature, wherein said cold generating circuits and a portion of said cryogenic refrigeration circuit share at least a refrigerated body circuit portion in common and said refrigerated bodies are refrigerated by said cryogenic refrigeration circuit, and said radiant heat shield bodies, are refrigerated by said pre-refrigeration generating circuits.

7. A cryogenic refrigeration system according to one of claims 3 to 6, wherein at least one of said refrigerated bodies is provided with a plurality of refrigerating pipes, and refrigerant flowing through at least one pipe of said plurality of refrigerating pipes is different from that flowing through other pipes of said plurality of refrigerating pipes.

8. A cryogenic refrigeration system according to one of claims 3 to 6, wherein at least one of said refrigerated bodies is provided with a plurality of refrigerating pipes, and refrigerant flowing through at least one pipe of said plurality of refrigerating pipes is different from that flowing through other pipes of said plurality of refrigerating pipes, and said refrigeration system further comprises a means for removing at least one refrigerant from said refrigerated bodies and said refrigerating pipes after said refrigerated bodies are refrigerated to a predetermined temperature.

9. A cryogenic refrigeration system according to claim 7, wherein one of said refrigerants is liquid nitrogen.

10. A cryogenic refrigeration system according to claim 8, wherein one of said refrigerants is liquid nitrogen.

11. A cryogenic refrigeration system according to one of claims 1 to 6, wherein said pre-refrigeration generating means is a cold generator provided with an expander to which a working medium is supplied from said first compression means or second compression means.

12. A cryogenic refrigeration system according to one of claims 1 to 6, wherein the refrigerated bodies are cryopanels which condense and solidify exhaust gas on the surfaces thereof to discharge the gas.

13. A cryogenic refrigeration system according to one of claims 1 to 6, wherein said cryogenic refrigeration circuit is provided with a heating means for heating a working fluid thereof so as to reproduce the refrigerated bodies and exhaust bas by heating with a heated working fluid.

* * * * *